United States Patent [19]

Harter et al.

[11] Patent Number: 5,696,782

[45] Date of Patent: Dec. 9, 1997

[54] HIGH POWER FIBER CHIRPED PULSE AMPLIFICATION SYSTEMS BASED ON CLADDING PUMPED RARE-EARTH DOPED FIBERS

[75] Inventors: Donald J. Harter; Almantas Galvanauskas; Martin E. Fermann, all of Ann Arbor, Mich.

[73] Assignee: IMRA America, Inc., Ann Arbor, Mich.

[21] Appl. No.: 445,287

[22] Filed: May 19, 1995

[51] Int. Cl.$^6$ ....................................... H01S 3/10
[52] U.S. Cl. .................... 372/25; 372/6; 372/102; 372/70; 372/98; 372/106; 372/703
[58] Field of Search ............................ 372/25, 6, 92, 372/98, 70, 106, 102, 703

[56] References Cited

U.S. PATENT DOCUMENTS

| | | | |
|---|---|---|---|
| 3,729,690 | 4/1973 | Snitzer | 331/94.5 |
| 4,546,476 | 10/1985 | Shaw et al. | 372/6 |
| 4,815,079 | 3/1989 | Snitzer et al. | 372/6 |
| 5,235,606 | 8/1993 | Mourou et al. | 372/25 |
| 5,400,350 | 3/1995 | Galvanauskas | 372/102 |
| 5,473,622 | 12/1995 | Grubb | 372/6 |
| 5,485,480 | 1/1996 | Kleinerman | 372/6 |
| 5,530,709 | 6/1996 | Waarts et al. | 372/6 |

OTHER PUBLICATIONS

Kringlebotn et al, "Er3+:Yb3+-codoped fiber distributed–feedback laser", Optics Letters, 15, No. 24, 15 Dec. 1994.

A. Galvanauskas et al., "Generation of femtosecond optical pulses with nanojoule energy from a diode laser and fiber based system," Appl. Lett. vol. 63, No. 13, Sep. 27, 1993, pp. 1742–1744.

N. Stelmakh et al., "Ultrashort pulse generation from a Q–switched AlGaAs laser with cw injection," Appl. Phys. Lett. vol. 59, No. 6, Aug. 5, 1991, pp. 624–626.

P. Delfyett et al., "200–fs optical pulse generation and intracavity pulse evolution in a hybrid mode–locked semiconductor diode–laser/amplifier system," Optics Letters, vol. 17, No. 9, May 1, 1992.

M.E. Fermann, "Ultrashort–Pulse Sources Based on Single–Mode Rare–Earth–Doped Fibers," Appl. Phys. B 58, 197–209 (1994) No month.

M. Nakazawa et al., "Femtosecond Optical Pulse Generation Using A Distributed–Feedback Laser Diode," Electronics Letters, Nov. 22, 1990, vol. 26, No. 24, pp. 2038–2040.

A. Galvanauskas et al., "High–power amplification of femtosecond optical pulses in a diode–pumped fiber system," Optics Letters, Aug. 15, 1994, vol. 14, No. 16, pp. 1201–1203.

D. Strickland et al., "Compression of Amplified Chirped Optical Pulses," Optics Communications, Dec. 1, 1985, vol. 56, No. 3, pp. 219–221.

A. Galvanauskas et al., "Hybrid diode–laser fiber–amplifier source of high–energy ultrashort pulses," Optics Letters, Jul. 15, 1994, vol. 19, No. 14, pp. 1043–1045.

A. Galvanauskas et al., "All–fiber femtosecond pulse amplification circuit using chirped Bragg gratings," Appl. Phys. Lett., Feb. 27, 1995, vol. 66, No. 9, pp. 1053–1055.

H. Po et al., "High Power Neodymium–Doped Single Transverse Mode Fibre Laser," Electronics Letters, Aug. 19, 1993, vol. 29, No. 17, pp. 1500–1501.

W.A. Clarkson et al., "Novel beam shaping technique for high–power diode bars," CLEO '94 No Date Available.

Y. Miyajima et al., "Rare Earth–Doped Fluoride Fiber Amplifiers and Fiber Lasers," Optical Fiber Technology 1, 1994, pp. 35–47 No Date Available.

*Primary Examiner*—Leon Scott, Jr.
*Attorney, Agent, or Firm*—Sughrue,Mion,Zinn,Macpeak & Seas, PLLC

[57] ABSTRACT

Cladding-pumped fibers are used for chirped pulse amplification of ultrashort optical pulses, increasing the average output power by one order of magnitude and substantially decreasing the cost of pump sources. Broad-area multimode diode pumped Er/Yb codoped fiber amplifiers and MOPA pumped high-power Er-doped fiber amplifiers are used to achieve chirped pulse amplification.

26 Claims, 9 Drawing Sheets

HIGH POWER FIBER CHIRPED PULSE AMPLIFICATION SYSTEMS BASED ON CLADDING PUMPED RARE-EARTH DOPED FIBERS

BACKGROUND OF THE INVENTION

1. Field of the Invention

The present invention relates to chirped pulse amplification of ultrashort optical pulses and, more particularly, to chirped pulse amplification using cladding-pumped fibers.

2. Description of the Related Art

Since their first manufacture in 1985, single-mode rare-earth-doped fibers have steadily developed into one of the most widely used solid state laser media. The main reason is clearly their unmatched performance as optical amplifiers in long-distance telecommunication systems, which was demonstrated as early as 1987. Rare-earth-doped fibers have also been used in more advanced applications, such as amplifiers for soliton-based communication systems, which hold the promise to revolutionize telecommunication systems.

Early work was also performed with single-mode rare-earth-doped fibers, mainly concerned with optimization of the performance of these fibers as continuous wave (cw) laser sources. The efforts to optimize the cw operation of rare-earth-doped fiber lasers has also led to the early suggestion of double-clad fiber structures as simple devices for the attainment of high output powers, as disclosed in U.S. Pat. No. 4,815,079 to Snitzer et al.

Double-clad fiber structures allow the use of low brightness diode arrays as pump sources, where the pump light is injected into a guiding cladding rather than into the fiber core. Thus, brightness conversion from a multi-mode diode laser into a single-mode fiber laser is efficiently obtained. The only penalty paid by using cladding-pumped fiber lasers is that the effective absorption is reduced by the ratio of the core size to cladding size, which is typically a factor of 100. Therefore, fiber lengths of up to 100 times that of single-clad fiber structures have to be used to make an efficient fiber laser.

All the above-mentioned applications have in common a lack of concern with extracting high energy and high peak power pulses from single mode rare-earth-doped fibers. In the prior art systems, the laser signal is cw. Other prior art cladding pumped systems amplify signals having widths of a few tens of picoseconds with energies of a few pJ (as in soliton communication systems).

However, in order to consider fiber lasers as practical sources for most nonlinear optics applications, the power levels generated by these cw or quasi-cw systems are not sufficient. For example, for the operation of typical high-efficiency optical parametric oscillators, sub-picosecond pulses with pulse energies of around 10 nJ are required. In the case of optical parametric amplifiers, sub-picosecond pulses with pulse energies of around 10 µJ are needed. Thus, any attempt to introduce double-clad pumped fiber lasers as amplifiers for such systems will adversely affect their operation, since the long lengths of these amplifiers will cause a wide array of prohibitive nonlinear effects and prevent the attainment of pulses with peak powers larger than 1 kW. Yet compact, all-integrated sources of ultrashort (femtosecond to picosecond) high-energy (nanojoule to microjoule) and high average power (100 mW–1 W) pulses are the key to making ultrafast technology practical. Moreover, to be commercially successful, such devices must provide robust operation while having relatively low cost and being suitable for mass-production.

Compact semiconductor and fiber lasers of ultrashort optical pulses have been developed in order to provide the above features. In addition, different techniques for ultrashort pulse generation have been developed for operating these devices. For example, picosecond and femtosecond pulses from semiconductor laser diodes can be generated using fast-tuning of the emission wavelength, gain-switching or mode-locking. However, femtosecond and picosecond pulses from fiber lasers can currently only be obtained with mode-locking techniques. A hybrid approach is also possible, in which initial longer pulses are generated with fast-tuned or gain-switched laser diodes and then compressed to shorter duration using soliton-effect compression in an optical fiber or fiber amplifier.

The above-mentioned developments have been reported in *Appl. Phys. Lett.*, "Generation of femtosecond optical pulses with nanojoule energy from a diode laser and fiber based system," A. Galvanauskas et al., Sep. 27, 1993; *Appl. Phys. Lett.*, "Ultrashort pulse generation from a Q-switched AlGaAs laser with cw injection," N. Stelmakh et al., Aug. 5, 1991; *Optics Letters*, "200-fs optical pulse generation and intracavity pulse evolution in a hybrid mode-locked semiconductor diode-laser/amplifier system," P. Delfyett et al., May 1, 1992; *Appl. Phys.*, "Ultrashort-Pulse Sources Based on Single-Mode Rare-Earth-Doped Fibers," M. Fermann, Jun. 21, 1993; and *Electronics Letters*, "Femtosecond Optical Pulse Generation Using a Distributed-Feedback Laser Diode," M. Nakazawa et al., Nov. 22, 1990, which are incorporated herein by reference.

Although operating these devices according to the above methods may provide ultrashort pulses, most potential applications require pulses having higher energies and average powers than is provided by the above systems. Maximum powers and pulse energies in semiconductor laser sources are typically limited respectively to about 10 mW and −100 pJ by nonlinear effects, gain saturation and a low threshold for catastrophic damage. In contrast, fibers can provide pulse energies up to the microjoule level and average powers in excess of 1 W. However, mode-locked fiber lasers can give only limited pulse energies (100 pJ–1 nJ) and relatively low average powers (below 100 mW), because they rely on nonlinear effects under specific ranges of conditions. Direct amplification of femtosecond and picosecond pulses in fibers is also limited to below about 1 nJ due to the low threshold of nonlinear effects.

Use of the chirped pulse amplification (CPA) technique with fiber amplifiers is the potential solution to the above problem of low energies and powers. CPA with fiber amplifiers can successfully utilize the potential of fibers to increase pulse energies and average powers from compact fiber and laser diode sources to the levels comparable to those currently obtainable with many large-frame scientific lasers.

According to the CPA method, ultrashort pulses are stretched prior to amplification, then amplified, and finally recompressed prior to transmission. By amplifying stretched pulses of relatively long duration, the peak power in the amplifier is maintained relatively low such that nonlinear effects and pulse break-up are prevented. However, due to the physical properties of optical fibers and fiber amplifiers, there are a number of problems and limitations to be overcome for implementing CPA in fibers: nonlinear effects in fibers occurring at high peak powers, ASE-limited gain, increase in recompressed-pulse duration due to gain narrowing effect, limited output powers due to limited pump powers, recompression of pulses down to their initial duration using compact compressor and stretcher arrangements, etc.

The inventors of the instant invention have previously applied CPA techniques with fiber amplifiers for energy amplification of laser diode and fiber laser pulses to obtain microjoule picosecond and femtosecond optical pulses at 10–100 mW of average output power. A description of this work can be found in Hybrid Diode-Laser Fiber-Amplifier Source of High-Energy Ultrashort Pulses, A. Galvanauskas, M. E. Fermann, P. Blixt, J. A. Tellefsen and D. Harter, *Opt. Lett.* 19, 1043 (1994); and in Compact Ultrahigh-power Laser Systems, A. Galvanauskas, *Int. Soc. of Optical Engineering Conf. on Lasers and Appl., OE LASE* 94, San Jose, 1995, paper 2377-14; which are incorporated herein by reference. The primary solution for obtaining high-energy pulses was to achieve high gain of over 60 dB by using optical gates between the amplification stages. The pulses were stretched and recompressed using bulk diffraction-grating compressors and stretchers.

For a better understanding of the technical difficulties involved in implementing high-power ultrashort pulse technology, it should be noted that there is a tradeoff between the high-energy and high-power regimes of the fiber amplifiers, and limitations in these two cases are different. Energy amplifiers are designed to efficiently extract stored energy as opposed to the pump power. For high pulse energies, high pump powers are not required. In fact, a maximum amplifier gain can be maintained by using low repetition rates and sacrificing the average output power of the amplified pulses. In contrast, to obtain a high-power amplified output, a high power for pumping and efficient power extraction at high pulse-repetition rates are required.

The system of the present invention achieves high average output powers at the level of 100 mW–10 W while simultaneously maintaining compactness and reducing the cost of the whole fiber-CPA system.

SUMMARY OF THE INVENTION

The system according to the present invention achieves high-powers with a fiber-based CPA by using cladding-pumped fibers to accommodate the multimode diode-laser output for pumping, and thus obtaining high pump powers and high output powers at considerably low cost. The disclosed and claimed novel system implements proper integration of cladding-pumped fiber amplifiers with the CPA system, while maintaining short duration and quality of amplified optical pulses. In addition, the disclosed embodiments demonstrate employment of hybrid fiber-grating and diffraction grating arrangements for pulse compression to achieve compactness of the system without sacrifice of the maximum peak power of the amplified and recompressed optical ultrashort pulses.

The disclosed embodiments demonstrate system designs that allow the use of double-clad fiber structures as high power amplifiers for high power laser pulses. These embodiments use several derivatives of the chirped pulse amplification technique, i.e., ultrashort optical pulses are dispersively stretched (using, for example, chirped fiber Bragg gratings) to long temporal lengths before amplification in the double-clad amplifiers. This ensures that the peak power in the double-clad amplifier stays low and any Kerr-type non-linearities are minimized. The original pulse width is then recovered by recompressing the pulses in a chirped fiber Bragg grating that is oppositely chirped to the first one.

As a result, the high cw power capabilities of double-clad fiber structures can now be combined with the high-energy storage capabilities of single mode fibers for the first time, and pulses with ultra-high peak powers and pulse energies can be generated with an unprecedented degree of simplicity. The disclosed technique does not require any special fiber designs, e.g., the off-center core as suggested in the above-mentioned patent to Snitzer et al. The fiber core can be conventionally placed in the middle of the cladding. For example, the fiber cladding simply needs to be surrounded with a low index material, such as silicon rubber, to construct a waveguide for the pump light. Such a fiber design comprises a conventional fiber with a low-index coating, as widely used before the advent of acrylate coatings for optical fibers.

BRIEF DESCRIPTION OF THE DRAWINGS

FIG. 2(*b*) is a diagram of a conventional double-clad fiber amplifier with a multimode laser-diode array or broad-area diode.

DETAILED DESCRIPTION OF THE PREFERRED EMBODIMENTS

Figure 1:
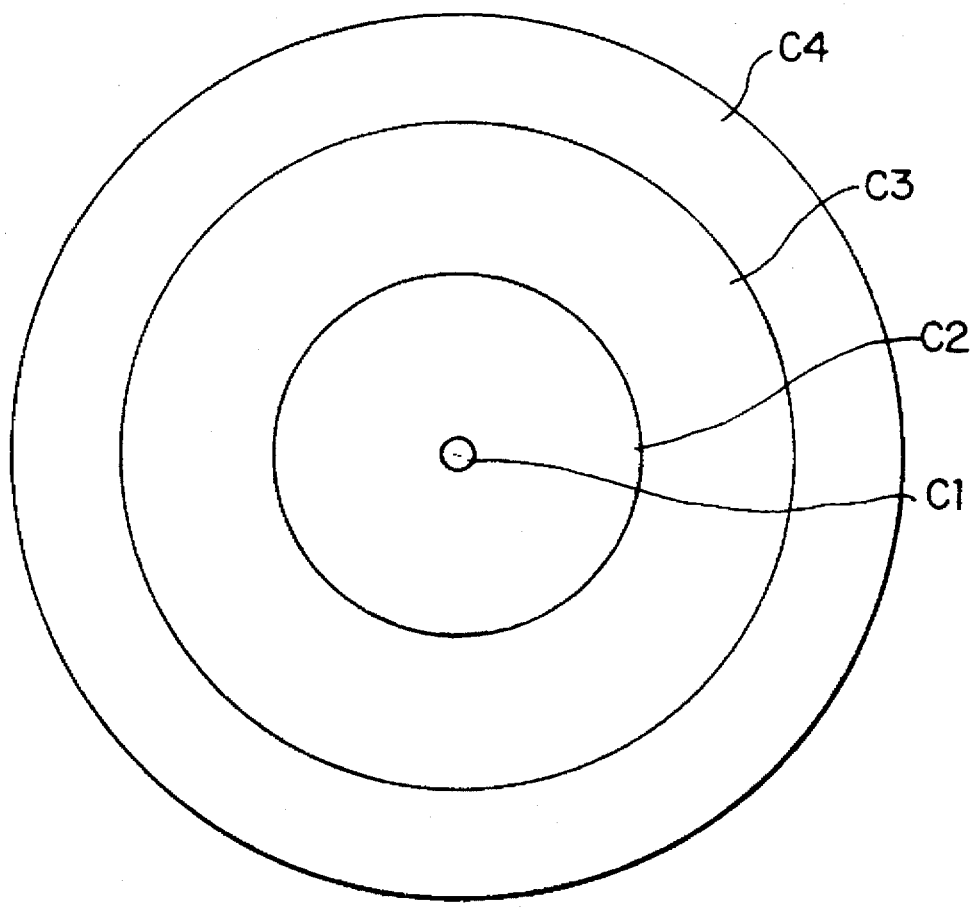
FIG. 1 is a diagram showing a structure of a suitable fiber for cladding pumping.

A double-clad fiber suitable for implementing the present invention is shown in FIG. 1. The fiber of FIG. 1 consists of a small-diameter single-mode central core C1 with a small numerical aperture (N.A.), surrounded by a larger multimode core C2 (with large N.A.). C3 is the second cladding, which is surrounded by fiber coating C4. Therefore, C2 serves both as a cladding for confining signal in the single-mode core C1, and as a multimode waveguide for propagating pump light. In general, the cross-section of such fiber can be completely circularly-symmetrical or have some asymmetry induced, as taught in the above recited patent to Snitzer et al. However, as mentioned above, although asymmetry is a useful feature to enhance pump absorption in the central core, the inventors have experimentally found that the present invention can be implemented with symmetrical fibers with comparable results.

Figure 2A:
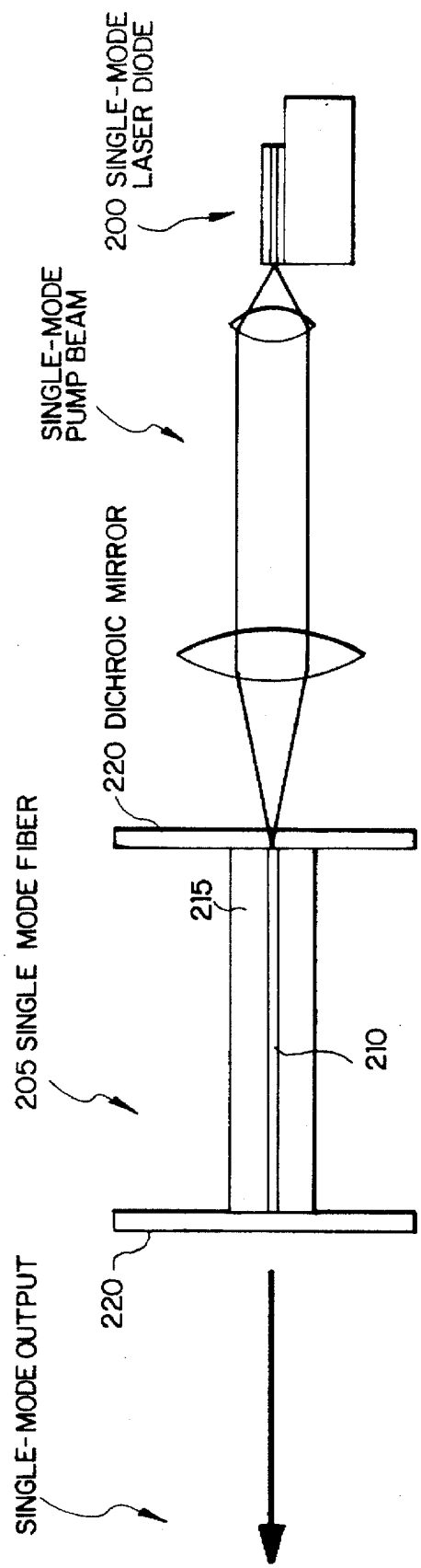
FIG. 2(*a*) is a diagram of a conventional arrangement for pumping using single-mode fiber with a single-spatial mode laser diode.

In cw systems, double clad fibers have been used to convert low-brightness pump beam into a high-brightness beam. This concept can be illustrated by contrasting FIG. 2(*a*) with FIG. 2(*b*). In FIG. 2(*a*), a conventional single-mode pumping scheme is shown. The output of the single spatial-mode pump diode 200 is coupled into the single-mode fiber 205. The single mode fiber 205 comprises a single mode core 210 and a single cladding 215. The single-mode fiber is bounded on both ends by dichroic mirrors 220. Apart from the low pump power, the problem in such an arrangement is that the asymmetry and the high N.A. of the single-mode laser diode output is usually difficult to match to the circularity-symmetrical low-N.A. fiber mode and achieve high coupling efficiency.

Figure 2B:
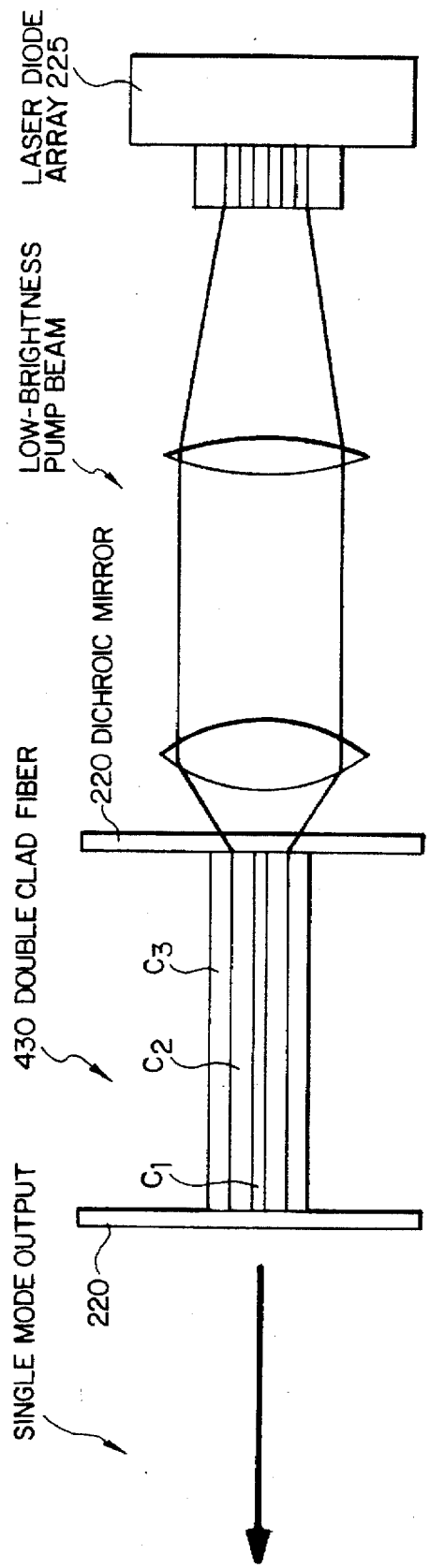

Improved coupling efficiency can be achieved by using the double-clad fiber arrangement shown in FIG. 2(b). The arrangement of FIG. 2(b) uses a laser diode array 225 rather than a single-mode diode. The low brightness pump beam of the diode array 225 is applied to the double clad fiber 230. The double clad fiber 230 is shown to be bounded on both ends by dichroic mirrors 220. The double clad fiber 230 can be similar to the double clad fiber shown in FIG. 1.

In the arrangement of FIG. 2(b), efficient coupling of the pump beam into the multimode core C2 can be achieved by matching N.A. and dimensions of the pump beam and the multimode core C2. The pump beam will be absorbed along the fiber by rare-earth ions in the central core C1. The two dichroic mirrors 220 partially reflect at the signal wavelength and transmit at the pump wavelength, so that a high-power low-brightness pump beam is converted into a high-power high-brightness single spatial-mode beam of continuous-wave (cw).

Conventional single-mode fiber amplifiers are designed to propagate single transversal modes both for pump and signal wavelengths. This limits potential pump sources only to those which have high quality circular output beams suitable for efficient coupling into single-mode fiber core. Such sources (for example, laser diode MOPAs and pigtailed laser diodes at 980 nm and 1480 nm) currently provide only 50 mW-1 W of pump power. This maximum pump power from single-mode sources is limited by the catastrophic damage on the facets of the laser.

Existing multistripe laser diode arrays and bars can provide pump powers higher than 10 W and are by one order of magnitude cheaper than single-mode sources. However, because of the large geometrical size of the light-emitting area, low brightness and beam asymmetry prevents efficient coupling into single-mode fibers. In the novel system of the present invention, this problem is overcome by using cladding-pumped fibers.

Figure 3:
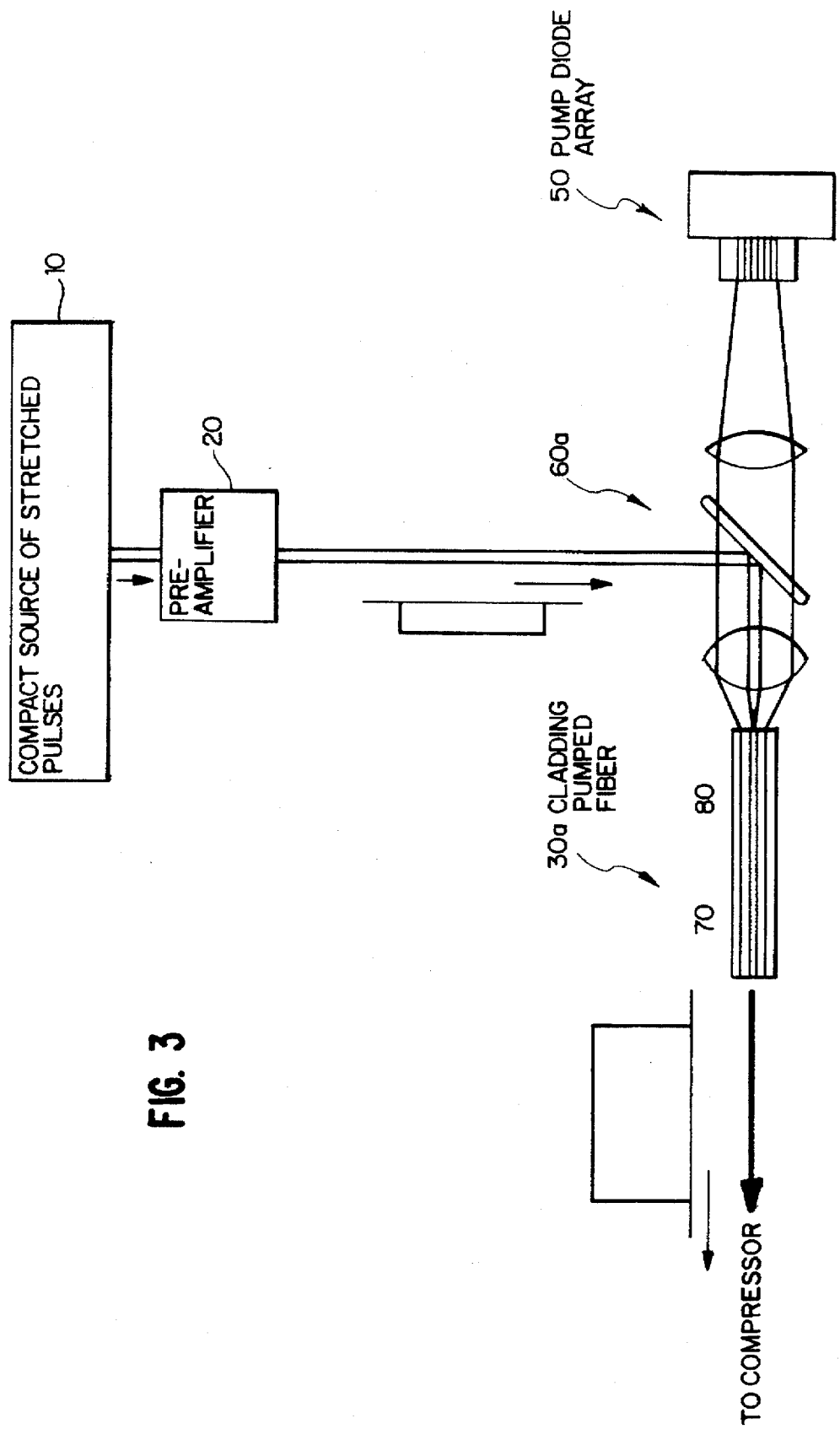
FIG. 3 is a diagram of fiber-based two-stage power amplification using CPA according to an embodiment of the present invention, showing a single-pass configuration.
Figure 4:
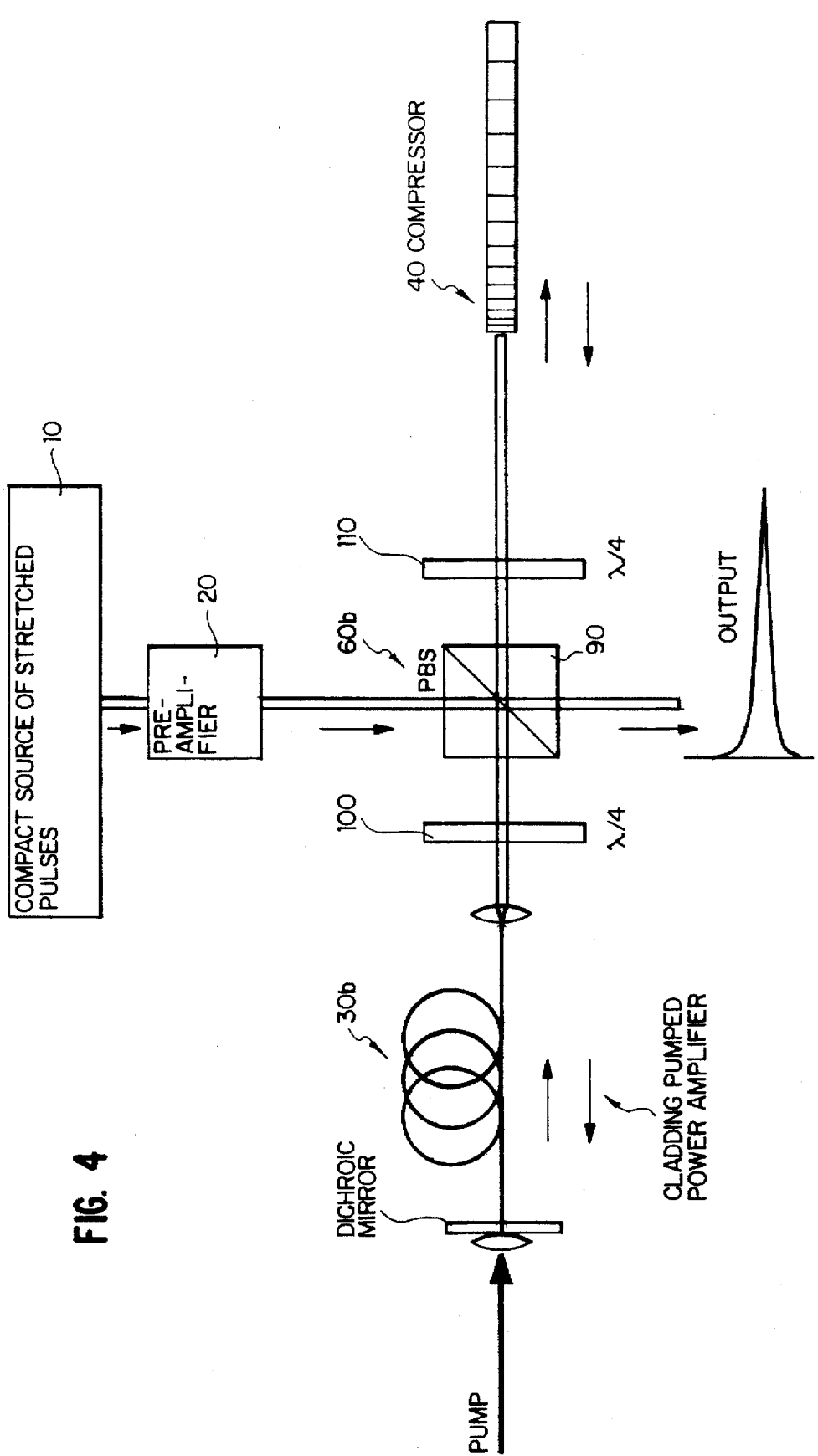
FIG. 4 is a diagram of fiber-based two-stage power amplification using CPA according to an embodiment of the present invention, showing a double-pass configuration.

In FIG. 3, a two-stage cladding-pumped CPA system configuration with single-pass power amplification is shown. In FIG. 4, the system with a double-pass power amplifier is shown, wherein elements similar to those shown in FIG. 3 have the same reference numerals. The double-pass system is preferable as it more efficiently extracts power from the last stage.

With continued reference to FIGS. 3 and 4, the system consists of a chirped pulse source 10, preamplifier stage 20, power amplifier stage 30a and 30b, and a compressor 40 (not shown in FIG. 3). Also shown in FIG. 3 is the pump diode array 50 and the optical-element arrangement 60a used to focus the light from the source 10 into the core 70 and the light from the diode array 50 into the first cladding 80. In order to implement the double-pass arrangement and the coupling into a grating compressor, the optical arrangement 60b in FIG. 4 includes a polarizing beam splitter 90 and wave plates 100, 110.

In CPA arrangements according to the present invention, as shown in FIGS. 3 and 4, optical feedback is excluded by known means. By injecting the signal beam into single-mode core and the pump beam into multimode cladding, a similar brightness conversion will be achieved and a low-power beam of femtosecond or picosecond pulses will be converted into a high-power beam. Improvement in output power, when compared to conventional single-mode geometry fiber CPA, is more than one order of magnitude.

The chirped pulses can be generated directly, e.g., using fast-tuning of diode lasers, or by stretching pulses from an ultrashort-pulse source in a diffraction-grating pair or with a chirped Bragg grating. Pulses should be recompressed after amplification with a similar type of compressor arrangement. Use of chirped Bragg gratings is preferable because it allows compact all-fiber circuits for CPA, which are intrinsically robust and reliable. However, since Bragg gratings at present can be efficiently implemented only in optical fiber, there is a trade-off between the length of the grating and the maximum peak power of the amplified and compressed pulses. In order to keep peak powers low in the stretched pulses at the end of the amplification, the pulse lengths should be sufficiently large and, therefore, the energy of the amplified pulses scales with the lengths of the fiber gratings. On the other hand, longer fiber gratings will have longer interaction lengths with compressed high peak-power pulses and at some energy level (between 100 nJ and 1 µJ, depending on pulse and grating parameters) nonlinear effects in the compressor itself will limit the attainable pulse energy.

Figure 5:
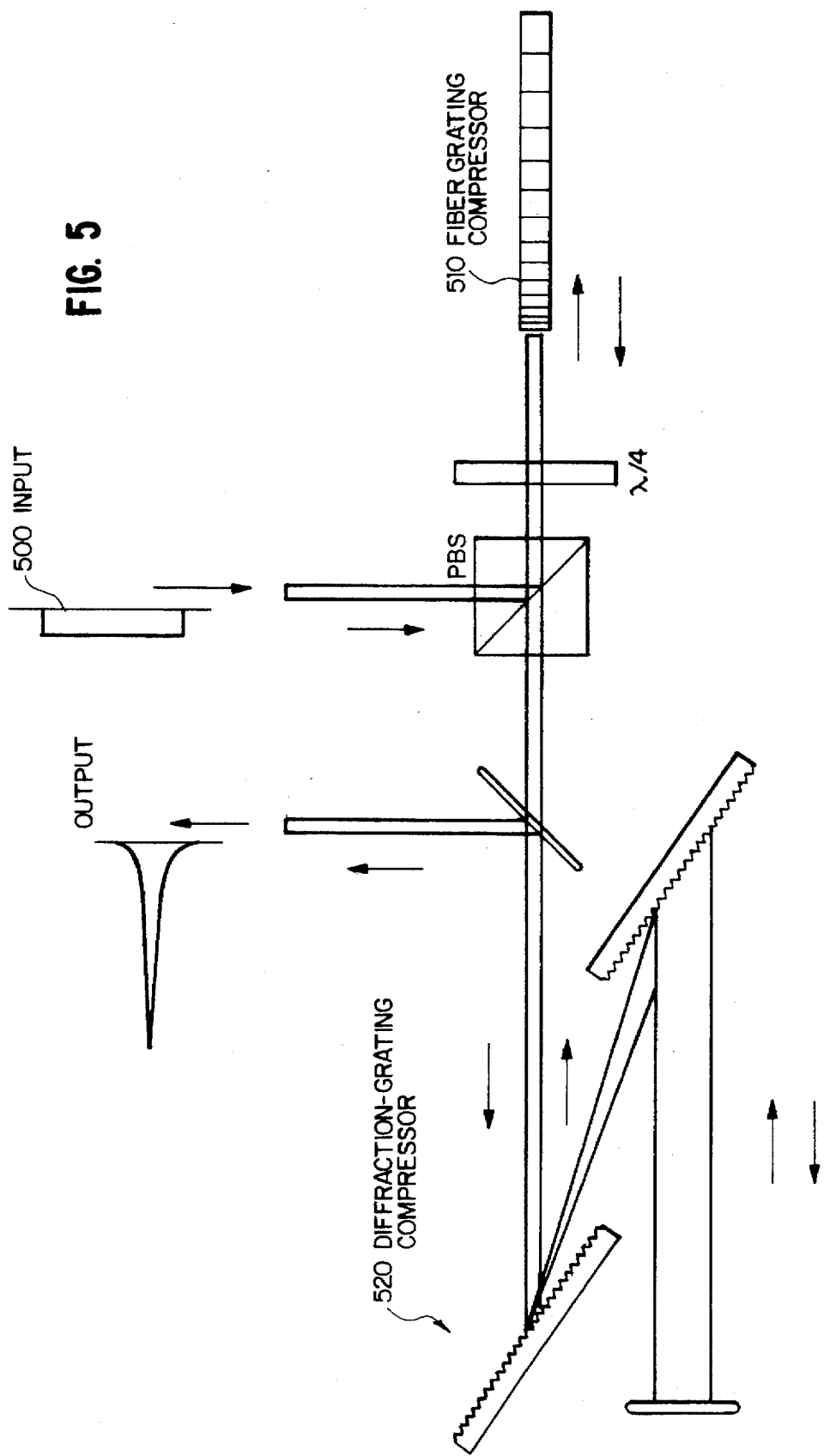
FIG. 5 is a diagram of a novel hybrid fiber-grating and diffraction-grating arrangement for compressing high energy pulses.

In FIG. 5, a preferable arrangement according to one aspect of the present invention is shown, wherein a hybrid combination of fiber-grating and diffraction-grating compressors is used. The amplified stretched pulse 500 is first precompressed with the fiber grating compressor 510 to a duration below the threshold of nonlinear effects in the fiber-compressor (about 10–50 ps). Final compression is accomplished with a diffraction grating compressor 520, which is designed to compress relatively short pulses and is very compact. Conventional metallic reflection gratings can be used for the diffraction grating compressor 520. However, transmission diffraction gratings, which are currently also available, are preferable, because they can be arranged in much more compact and robust arrangements than reflective gratings.

Typical powers provided with compact semiconductor and fiber laser sources are often on the level of 10–100 µW which usually are insufficient to saturate a power amplifier operating in a 100 mW–1 W output power regime. Therefore, a preamplifier is required to increase the signal level to 1–10 mW at the input of the second stage to reach saturation and allow efficient power extraction. However, it should be noted that specific fiber oscillator designs exist that provide sufficiently high output powers in 1–50 mW range, which is sufficient to saturate power amplifier without the use of a preamplifier. Because the system of the invention amplifies repetitive pulses rather than a cw signal, it is important that the repetition rate should be sufficiently high (1 100 MHz) to suppress amplification of the spontaneous emission in both amplification stages without using an optical gating technique.

The present inventors successfully constructed a CPA system with a multistripe-diode pumped Er/Yb codoped fiber amplifier and a high average power CPA system with Er-doped cladding pumped fiber amplifier. These systems are described below with reference to FIGS. 6 and 7 respectively. However, although these embodiments are described with respect to Er-doped fiber, the present invention as described herein can also be successfully applied to any of rare-earth doped fibers (e.g., Nd, Tm, Yb, Pr, etc.).

Picosecond CPA with Broad-area Diode Pumped Er/Yb Codoped Double Clad Fiber

Figure 6:
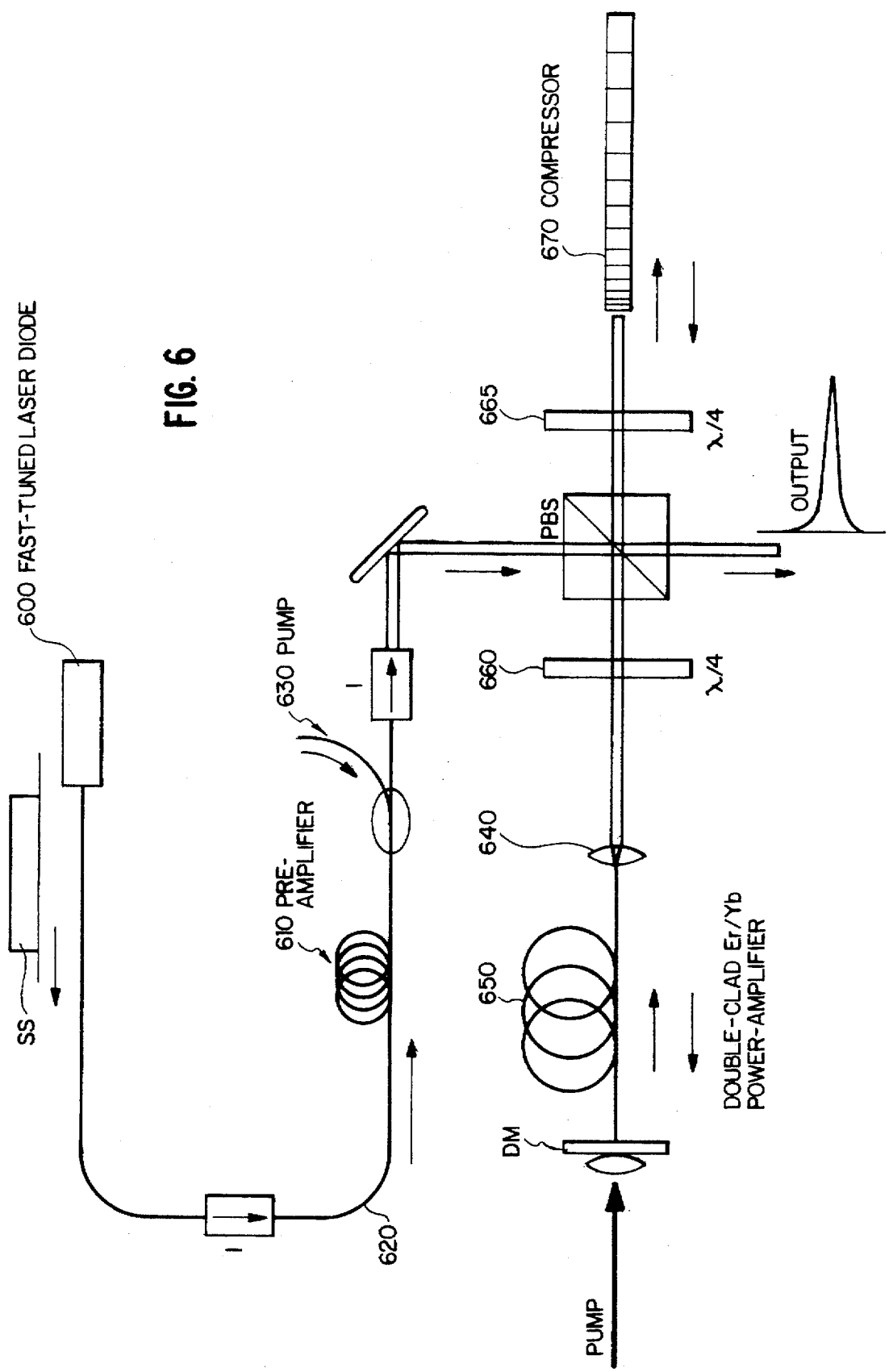
FIG. 6 is a diagram showing the experimental set-up for CPA of fast-tuned laser diode pulses with multistripe-diode pumped Er/Yb codoped double clad fiber which demonstrates the advantages of the instant invention.

The arrangement of a cladding-pumped picosecond CPA system devised by the inventors is shown in FIG. 6. In this embodiment, the central core C1 of the amplifier fiber 550 is codoped with $Yb^{3+}$ to efficiently absorb the pump light and to transfer the photoexitation to $Er^{3+}$ ions in the central core C1. This allows efficient pump-coupling from a large-area diode laser. Erbium doping level in the core was ~1000 ppm.

A particular feature of this embodiment is that dichroic mirrors are used with the double-clad fibers to separate/ combine pump and signal waves. Two dichroic mirrors for adding the pump light can be located at either end of the cladding pumped fiber. In contrast, conventional single-mode fiber systems use fiber WDM. Because in the double-clad case, the signal is single-mode and the pump is multimode, use of standard WDM is not possible. However, specially designed multimode WDM can be used to direct multimode pump into the inner cladding and preserve signal propagation in the central core. Methods other than dichroic mirrors can also be used to the same effect.

In this embodiment, chirped pulses were obtained by direct frequency-chirping of the emission of tunable laser diode 600. This system was designed to provide 50–100 mW average power and pulses of ~1 μJ energy. The two-stage amplifier design allowed ~30 dB large-signal gain and efficient power extraction. The first amplifier stage 610 was built using standard single-mode erbium-doped fiber 620, pumped with 50 mW at 1.48 μm from a pigtailed laser diode 630. The second power amplifier stage 640 was arranged with a double-pass geometry. A 1 W broad area laser diode (not shown) with light-emitting area dimensions of 100×1 μm was coupled through dichroic mirror DM into the cladding of amplifier fiber 650. More than 99% of the pump light at 980 nm was transmitted and 98% of the 1550 nm signal was reflected. The fiber length of amplifier fiber 650 was 5 m. Signal was coupled into the central core of the amplifier fiber 650 through the end opposite the location of dichroic mirror DM. Using polarizing beamsplitter BPS and two waveplates 660 the amplified beam was separated from the incoming beam and was launched into the compressor 670. In FIG. 6, the waveplates 660 are shown as λ/4 devices; however, alternatively, an λ/4–λ/2 arrangement can also be used. Compressor 670 can be either a diffraction grating pair or chirped in-fiber Bragg grating. With additional two waveplates 665, the beam reflected from the compressor was directed to the output of the system. Variation of the above embodiment are also possible. For example, waveplates 660 can be replaced with Faraday rotators. Arrangement with polarizing beamsplitter and waveplates (or Faraday rotators) can be replaced with optical isolators, which are insensitive to polarization of the redirected light and their use simplifies the arrangement.

Chirp bandwidth of the pulses from the laser diode 600 was 7 nm. The spectrum of the pulses was located at the 1530 nm peak of the gain spectrum of the amplifier fiber 650. 0.5 mW of average power from the first stage 610 was sufficient to saturate the second stage 640. Maximum output saturated power was 84 mW at the repetition rate of 800 kHz. Output pulse energy here increases as repetition rate decreases. At 60 kHz, the pulse energy reached its maximum of 0.98 μJ at 60 mW average power. Further increase of pulse energy was limited by the threshold of nonlinear effects in the double-pass cladding-pumped fiber 650. Power transmission through the compressor 670 was 50%.

Power and pulse energy characteristics were close to those obtained with a laser-diode MOPA pumped single-mode fiber amplifier as reported in *Optics Letters,* "Hybrid diode-laser fiber-amplifier source of high-energy ultrashort pulses," A. Galvanauskas, Jul. 15, 1994. The distinct advantage of the system according to this embodiment is the order of magnitude lower cost for the pump source of the power amplifier. Also, the 1 W broad area laser diode, used in this particular arrangement, can be replaced by much more powerful diode arrays with more than 10 W pump power at essentially the same cost. In addition, both stages of this system can be designed to be cladding pumped.

High Power Femtosecond CPA

The disadvantage of codoped fiber is that the gain bandwidth and the efficiency of power conversion from pump to signal is reduced, compared to single-doped silica fibers. Moreover, operation of any fiber amplifier in a femtosecond CPA system is much more complex than amplification of narrow-bandwidth signals. A CPA system for amplifying broad-bandwidth femtosecond pulses has to be designed to reduce spectral and temporal distortions of amplified and recompressed pulses.

For example, in the above described Er/Yb codoped system, the gain spectrum rolls-off at wavelengths of above 1543 nm in contrast to roll-off in standard Er-doped fibers of above 1562 nm. This has dramatic consequences on amplifying mode-locked fiber laser pulses, which typically are centered at wavelengths longer than 1550 nm. Considerable spectral narrowing and reshaping occurs after amplification of such pulses, resulting in poor quality of recompressed pulses.

The smallest gain narrowing occurs when the pulse spectrum is optimally chosen to match the gain peak of the fiber-amplifier gain spectrum (stimulated emission cross-section spectrum). Also, for the same purpose the gain bandwidth ideally should be much broader than the pulse spectrum. One possible solution is to operate the fiber amplifier in saturated-power regime, which flattens the amplifier spectral response. In this respect two-stage amplification with both stages operated in saturation was found to be advantageous. It is also possible to use optical filters to reshape the pulse spectrum during amplification in order to match spectral characteristics of the fiber amplifier. Another solution is to use different host materials or dopants either to obtain flat and broad gain or combine different fibers.

Figure 7:
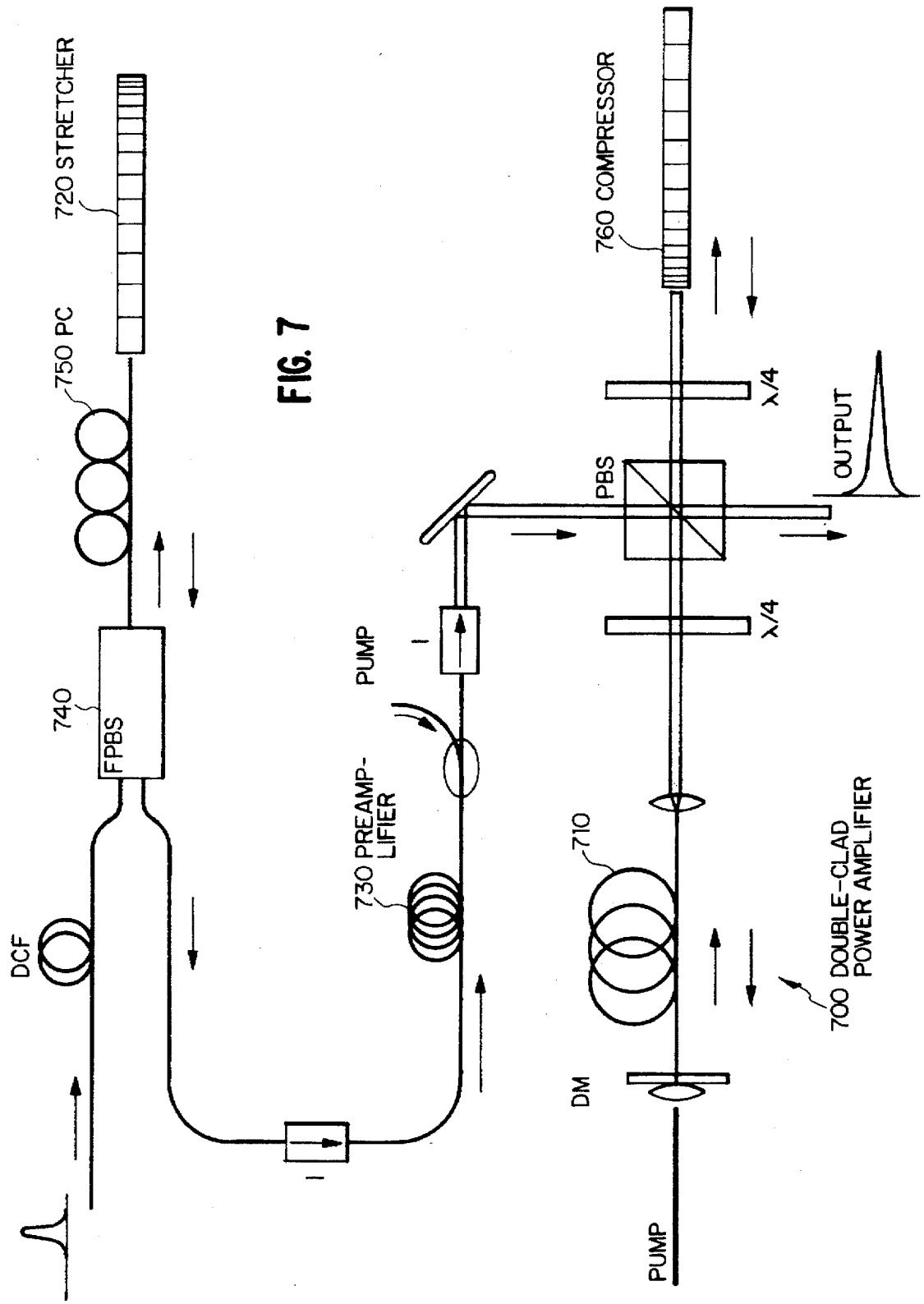
FIG. 7 is a diagram showing the experimental set-up for high average power CPA with Er-doped cladding pumped fiber amplifier and mode-locked fiber oscillator which demonstrates the advantages of the instant invention.

In the embodiment of FIG. 7, for femtosecond amplification, single-doped fiber with a pump cladding diameter smaller than that of the codoped fibers were used. Power amplifier 700 was built from highly doped ($Er^{3+}$ doping level 1000 ppm) doubly-clad erbium fiber 710. Only the central core C1 has erbium doping. The inner cladding has only 20 μm diameter allowing efficient cladding pumping without the use of $Yb^{3+}$ as a codopant. This fiber 710 retains the broad gain spectrum and high pump-signal conversion efficiency of single-doped silica fiber. Also, the gain spectrum matches the spectrum of the present mode-locked fiber oscillator, thus reducing unwanted spectral narrowing. The fiber 710 was pumped with two polarization multiplexed single-mode MOPA laser diodes (not shown) delivering 1.6 W of total power at 980 nm. The cladding-pumping scheme in this embodiment ensured very efficient (near 100%) input coupling of the single-mode pump. Efficient coupling of a multimode laser diode beam can alternatively be achieved employing beam shaping techniques, such as disclosed in *CLEO* '94, "Novel beam shaping technique for high-power diode bars," W. Clarkson et al.

An advantageous feature of using a single-doped fiber in this embodiment is that hosts other than silica-glass can be used. E.g., Er doped fluoride glass fiber can be also manufactured as a double-clad fiber with small cladding. The advantage of the fluoride host is that the gain bandwidth is about 2–3 times larger than that of silica-based Er-doped fibers. This is very important to drastically reduce the gain narrowing effect. With fluoride fibers, the duration of pulses after the CPA system can be as low as 100 fs.

In the set-up shown in FIG. 6, the pulse source (not shown) for CPA was passively mode-locked fiber oscillator delivering 200 fs FWHM and 20 pJ energy initial pulses at an adjustable repetition rate of 5–50 MHz. Pulses are stretched up to about 50 ps in 5 mm long positively chirped 17 nm bandwidth fiber Bragg grating 720. Reflected pulses are injected into preamplifier 730 using fiber-pigtailed polarizing beamsplitter (FPBS) 740 and fiber polarization controllers 750 (instead of bulk PBS and waveplates). The preamplifier 730 is used to increase input power to the level sufficient for saturating the power amplifier 700. Power amplifier 700 was arranged in the same double-pass configuration as in the previously described Er/Yb codoped system. A notable feature of the embodiment of FIG. 7 is that some length of the positive dispersion fiber is included before the preamplifier stage 730 to compensate the negative dispersion of all other fibers in the system between the grating stretcher 720 and the compressor 760.

Available average input power injected into power amplifier 700 was up to 10 mW. The power amplifier 700 boosts the average signal power to a level of 0.45 W. After recompression in a negatively chirped fiber Bragg grating 760, an average output power of 0.26 was reached. The resultant throughput was limited to 60% due to about 80% reflectivity of the grating and about 80% coupling efficiency into the fiber pigtail of the grating. 5.2 nJ pulse energies were obtained at a repetition rate of 50 MHz. By lowering repetition rate, pulse energy was increased to 20 nJ, which was the maximum limit for this duration of stretched pulses due to nonlinear effects. Pulse widths after recompression were 380 fs. This pulse duration increase with respect to the initial 200 fs was a result of gain narrowing due to the limited gain bandwidth of the fiber amplifier 700.

In the high-power fiber CPA system of FIG. 7, parameters were designed to eliminate or to reduce nonlinear effects at the end of the second-stage. In a properly designed system, pulse fluence corresponding to the saturated output power should be lower than the fluence at the threshold of nonlinear interaction in a fiber core. Nonlinearities that occur at high fluence levels are selfphase modulation (for short pulses), modulation instability (for longer pulses) and stimulated Raman scattering. The first two effects are caused by intensity dependence of the refractive index of an optical material. Their general effect is to induce spectral broadening and phase nonlinearities, which results in broadened and reshaped recompressed pulses. Typically, satellite pulses, modulation sidebands and low-intensity background containing a considerable part of the pulse energy are formed. Stimulated Raman scattering dissipates pulse energy into spectral bands outside the amplification band, causing uncompressable background and loss of pulse energy.

In the embodiments of the present invention, these nonlinear effects were avoided by reducing the length of the nonlinear interaction by reducing the length of the fiber amplifier and increasing the doping level, to reduce the fluence in the fiber core by properly designing cladding pumped fiber with an enlarged transversal spatial extent of a propagating mode, and by using sufficient pulse stretching to avoid high peak powers. Also, repetition rates of the pulses were adjusted to lower the peak fluence at high power levels. In systems according to the present invention, when cladding-pumping without codoping is performed, the length of the fiber should be sufficiently long to allow a sufficient number of bounces of the pump within the first cladding to be efficiently absorbed when crossing the doped central core. This can be matched to the requirement of shorter fiber for lower nonlinear interaction only by properly choosing fiber length, doping level of the central core and the ratio between the diameters of the cladding and the central core.

Figure 8:
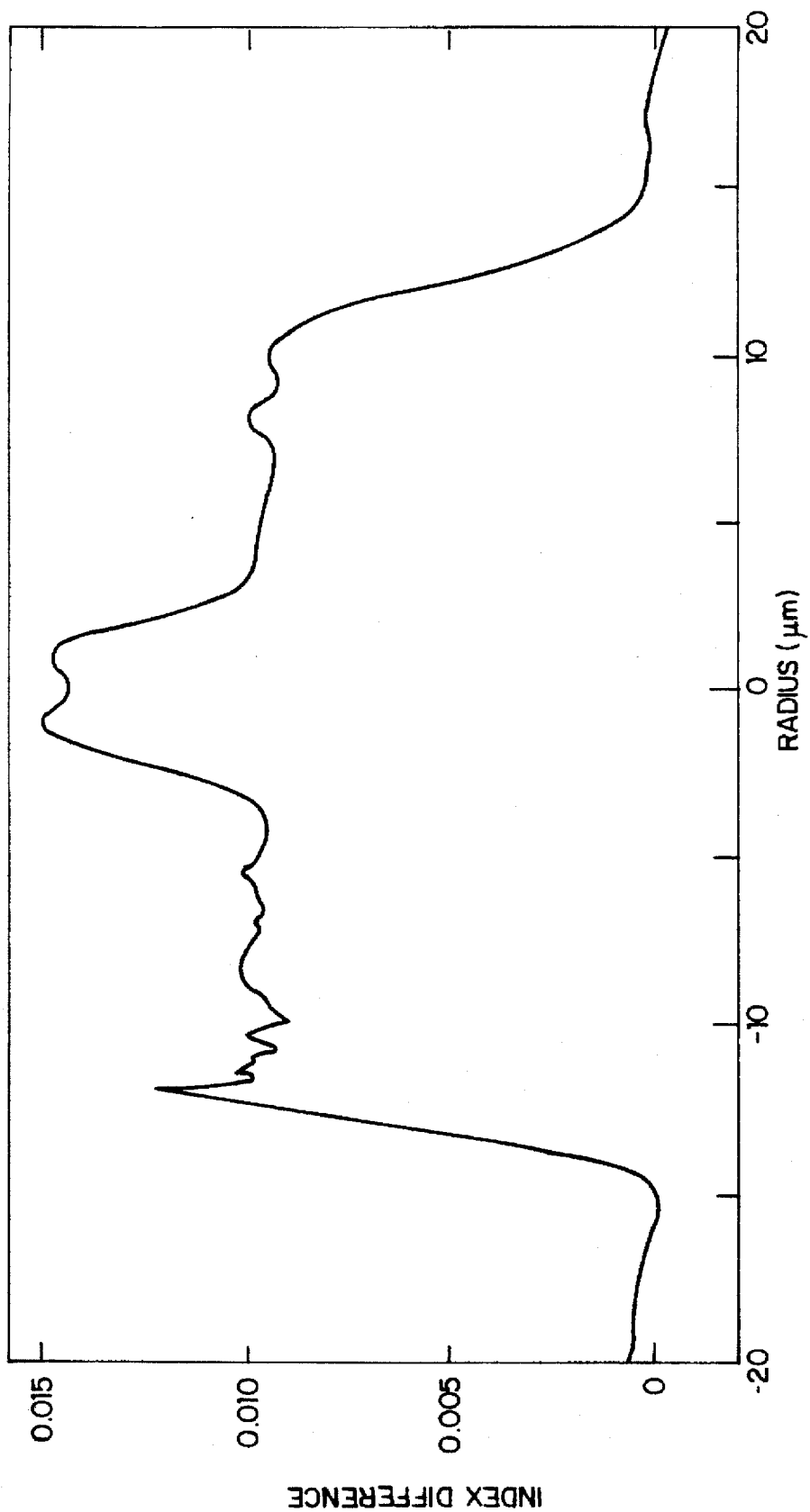
FIG. 8 is a diagram showing a transverse profile of the single-doped cladding pumped fiber used in the experimental set-ups of FIGS. 5 and 6.

The optimized length of second-stage fiber 710 was 3.8 m at the doping level of 1000 ppm. Transversal profiles of the pump-cladding and central core of fiber 710 are shown in FIG. 8. Refractive index differences between central core and first cladding were chosen to provide a transversal mode larger than in a standard single-mode fiber by about 40%. Further increase of the mode-diameter was limited by the increased scattering into higher-order cladding modes. As a result of this optimization, 5 mm linearly chirped fiber gratings used for pulse stretching and recompression provided sufficiently low peak powers at the highest repetition rates of mode-locked pulses. Because of the earlier discussed considerations on matching pulse and gain spectra, grating reflection spectra were chosen to coincide with the gain spectral peak.

While the invention has been described with reference to specific embodiments thereof, it will be appreciated by those skilled in the art that numerous variations, modifications, and embodiments are possible, and accordingly, all such variations, modifications, and embodiments are to be regarded as being within the spirit and scope of the invention.

What is claimed is:

1. A high power chirped pulse amplification system generating ultrashort pulses, comprising:
   means for generating chirped light pulses, each of said chirped light pulses having a defined time period,
   a power amplifier stage comprising a double-clad fiber and a light pump for receiving said chirped light pulses from said light source and amplifying said chirped light pulses by increasing the energy and average power of the chirped light pulses, to thereby output amplified chirped light pulses, and
   a compressor compressing said amplified chirped light pulses received from said power amplifier stage to thereby shorten said time period and output ultrashort amplified chirped pulses.

2. The high power chirped pulse amplification system of claim 1, further comprising means for transmitting said chirped light pulses into an input side of said double-clad fiber for amplifying said chirped light pulses, coupling means for coupling said light pump to said double-clad fiber so as to transmit the output of said light pump into said double-clad fiber, and means for coupling an output side of said double-clad fiber into said compressor for transmitting said chirped light pulses from the output side of said double-clad fiber into said compressor.

3. The high power chirped pulse amplification system of claim 2, wherein said pump comprises one of a broad area laser diode and a laser diode array.

4. The high power chirped pulse amplification system of claim 3, wherein said compressor comprises chirped Bragg gratings.

5. The high power chirped pulse amplification system of claim 3, wherein said compressor comprises a hybrid combination of fiber grating and diffraction grating.

6. The high power chirped pulse amplification system of claim 5, wherein said diffraction grating comprises a transmission diffraction grating.

7. The high power chirped pulse amplification system of claim 3, further comprising a preamplifier located prior to said power amplifier, said preamplifier comprising a single-clad doped fiber and a single transverse mode laser diode pump.

8. The high power chirped pulse amplification system of claim 7, wherein a central core of said double-clad fiber is a Yb/Er codoped fiber.

9. The high power chirped pulse amplification system of claim 3, wherein said source comprises a tunable laser diode.

10. The high power chirped pulse amplification system of claim 3, further comprising a preamplifier located prior to said power amplifier, said preamplifier comprising a double clad doped fiber and a laser diode pump.

11. The high power chirped pulse amplification system of claim 2, wherein a central core of said double-clad fiber is a single-doped fiber.

12. The high power chirped pulse amplification system of claim 11, wherein said single-doped fiber is a fluoride glass fiber.

13. The high power chirped pulse amplification system of claim 2, wherein said coupling means comprises at least one optical element for transmitting said output of said pump into said input side of said double-clad fiber.

14. The high power chirped pulse amplification system of claim 2, wherein said coupling means comprises a pigtail coupler.

15. The high power chirped pulse amplification system of claim 2, wherein said input side of said double clad fiber coincides with said output side of said double clad fiber.

16. The high power chirped pulse amplification system of claim 1, further comprising a polarizing beam splitter coupled to said amplifier, and wherein said compressor is coupled to a first side of said polarizing beam splitter, and said power amplifier is coupled to said polarizing beam splitter on a second side opposite to said first side.

17. The high power chirped pulse amplification system of claim 16, further comprising a first wave plate disposed between said polarizing beam splitter and said power amplifier and a second wave plate disposed between said compressor and said polarizing beam splitter.

18. The high power chirped pulse amplification system of claim 17, further comprising a dichroic mirror disposed between said pump and said double-clad fiber.

19. The high power chirped pulse amplification system of claim 18, wherein said preamplifier stage comprises a single-mode doped fiber and a laser diode pump, and wherein a first isolator is disposed at an input of said preamplifier stage, and a second isolator is disposed at an output of said preamplifier stage.

20. The high power chirped pulse amplification system of claim 19, wherein a central core of said double-clad fiber is a Yb/Er codoped fiber.

21. The high power chirped pulse amplification system of claim 20, wherein said source comprises a tunable laser diode.

22. The high power chirped pulse amplification system of claim 1, further comprising a dispersion correction fiber.

23. A compressor for compressing chirped laser pulse signals having a defined time period, comprising:

a fiber grating receiving the chirped laser pulse signals and compressing said chirped laser pulse signals to shorten said time period to a duration below an onset of non-linear effects in said fiber grating;

a diffraction grating receiving said chirped laser pulse signals compressed by said fiber grating and further compressing said chirped laser pulse signals to further shorten said time period.

24. The compressor of claim 23, wherein said diffraction grating comprises a reflection grating.

25. The compressor of claim 23, wherein said diffraction grating comprises a transmission grating.

26. The compressor of claim 23, further comprising a polarizing beam splitter disposed between said fiber grating and said diffraction grating, and a wave plate disposed between said polarizer beam splitter and said fiber grating.

* * * * *